J. BOONE.
Post-Hole Digger.

No. 43,085.

Patented June 14, 1864.

Witnesses.
J W Coombs
G W Reed

Inventor
J. Boone
per Munn & Co.
Atty's

UNITED STATES PATENT OFFICE.

JONATHAN BOONE, OF CLINTONVILLE, KENTUCKY.

IMPROVED POST-HOLE DIGGER.

Specification forming part of Letters Patent No. 43,085, dated June 14, 1864.

*To all whom it may concern:*

Be it known that I, JONATHAN BOONE, of Clintonville, county of Bourbon, and State of Kentucky, have invented a new and Improved Post-Hole Digger; and I do hereby declare that the following is a full, clear, and exact description of the same, reference being had to the accompanying drawings, forming a part of this specification, in which—

Figure 1:
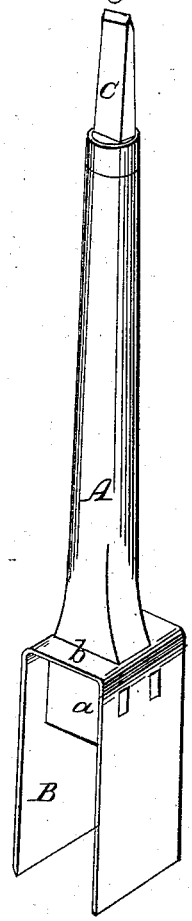
Figure 2:
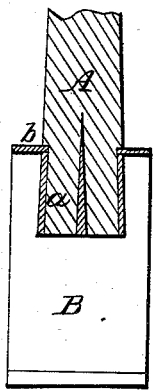

Figure 1 represents a perspective view of my invention. Fig. 2 is a longitudinal vertical section of the same.

Similar letters of reference in both views indicate corresponding parts.

This invention consists in an instrument for digging post-holes provided with two or more blades or cutters attached in a position parallel to each other to a common handle or staff in such a manner that on pushing the blades down in the ground the earth is held between them, and on raising the instrument it raises the dirt with it, and a hole is produced just the size of the post or a little less, and if said post is driven down with a mall or sledge it will be perfectly solid and firm without ramming. The handle of the instrument is also provided with a pick at the end opposite to the blades for the purpose of cutting roots and removing rocks or other obstructions.

To enable those skilled in the art to make and use my invention, I will proceed to describe it.

A represents a handle, round or square or of any convenient form, and made of wood or any other suitable material. One end of this handle is inserted into a socket, *a*, that is attached to the plate *b*, which connects the cutting-blades B. When two cutting-blades are used the plate *b* is made solid with the same out of a strip of sheet-steel or sheet-iron, the cutting-edges being made of steel and hardened; but when more than two cutting-blades are used all but two are secured to the plate *b* by means of rivets or in any other suitable manner.

The handle is fastened in the socket *a* by means of a wedge and cross-pins or in any other suitable manner, and the cutting-edges of the blades B are chamfered off on the outside, leaving the inside of each blade perfectly flat, so that in pushing the blades down in the ground they are slightly compressed and the earth is firmly retained between them. In withdrawing the blades from the ground, therefore, they carry up the dirt, and a hole can be made just the size of the blades, with perfectly smooth and even sides.

In order to make a hole the proper size for a post the cutting ought to be made of the same width as the lower square part of the post, or rather a little the narrowest, or the post may be squared off to correspond to the size of the cutting-blades, so that the hole made by said blades is a little smaller than the post. The post is then driven down by means of a mall or sledge, and it is perfectly firm and solid. Much labor is saved by these means, because it is not necessary to dig the hole larger than the post in order to be able to remove the dirt, and after the post is inserted into the hole no ramming is required to render it firm.

C is a pick or cutter attached to that end of the handle A opposite the blades B, and this pick serves to cut roots or to remove rocks or other obstructions that may occur in digging the hole.

What I claim as new, and desire to secure by Letters Patent, is—

1. A post hole-digger having two or more cutting-blades, B, attached to a common handle, A, as and for the purpose specified.

2. The combination of the pick C with the handle A and blades B, as and for the purposes set forth.

JONATHAN BOONE.

Witnesses:
JAS. T. SHRADRE,
MIHEL LOUGHLIN.